Figure 1:
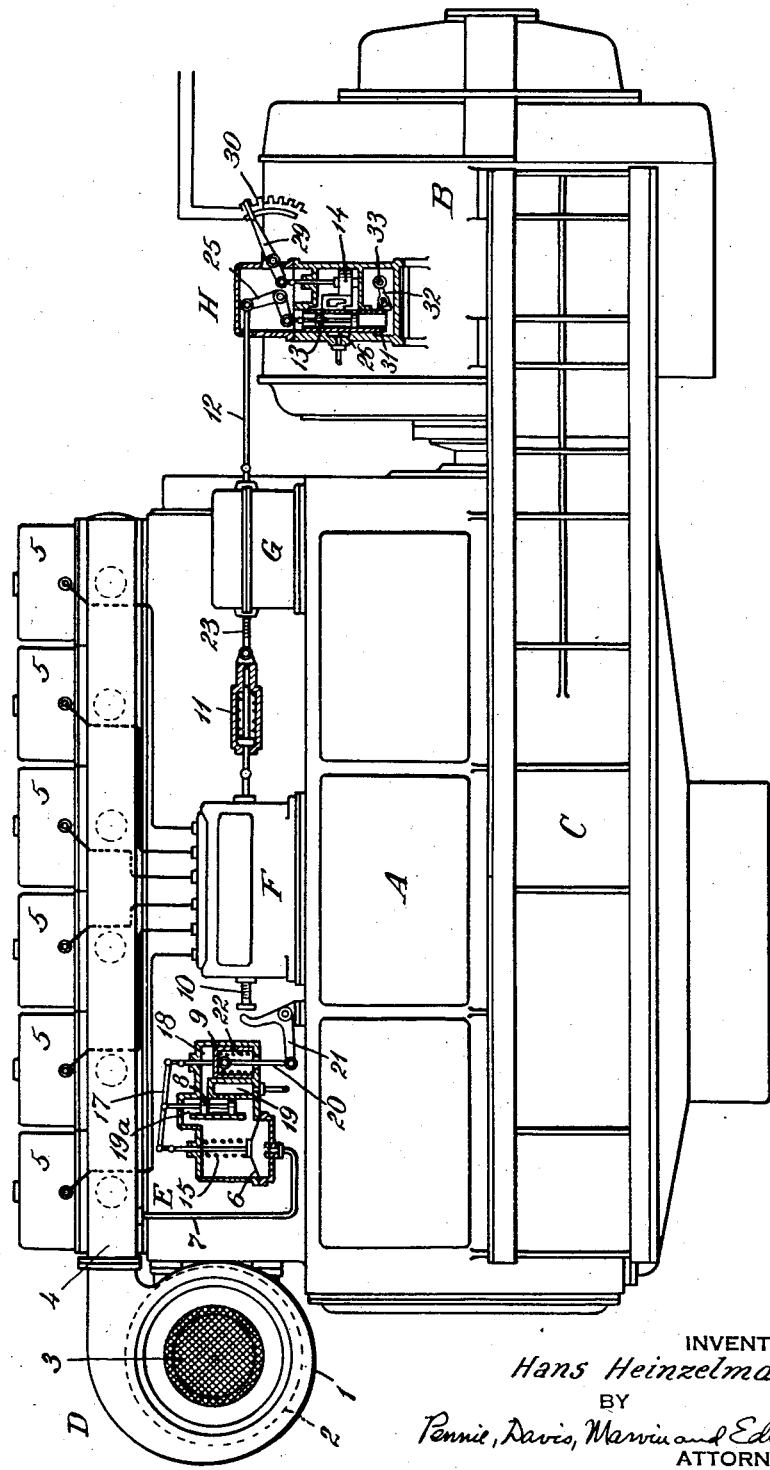

Nov. 14, 1939.  H. HEINZELMANN  2,180,108
SUPERCHARGED COMBUSTION ENGINE
Filed May 4, 1936  3 Sheets-Sheet 2

INVENTOR
Hans Heinzelmann
BY
Pennie, Davis, Marvin and Edmonds
ATTORNEYS

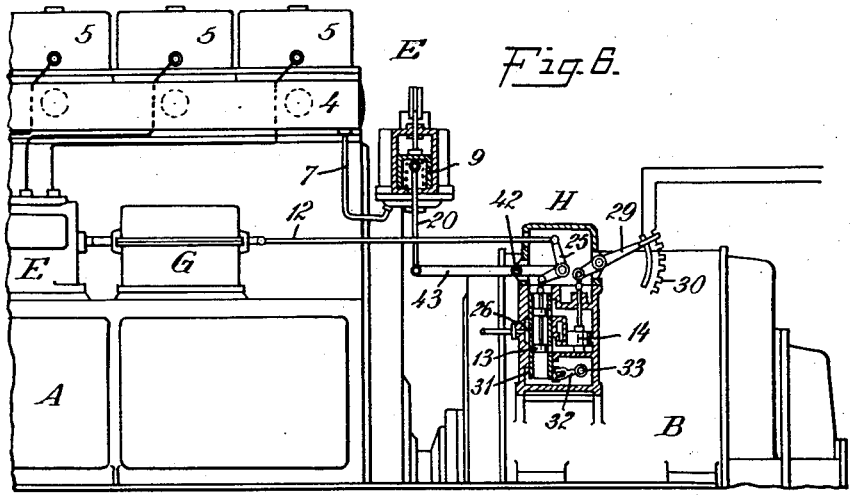
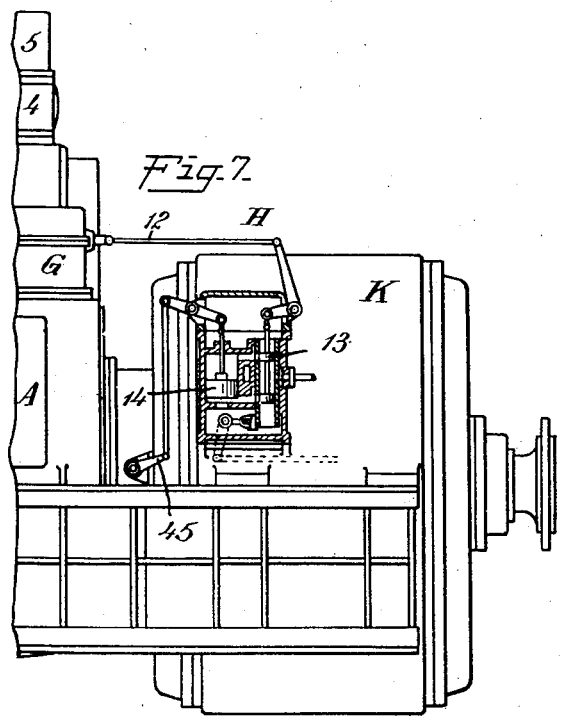

Patented Nov. 14, 1939

2,180,108

UNITED STATES PATENT OFFICE 2,180,108

SUPERCHARGED COMBUSTION ENGINE

Hans Heinzelmann, Effretikon, Switzerland, assignor to Sulzer Freres, Societe Anonyme, Winterthur, Switzerland Application May 4, 1936, Serial No. 77,658
In Switzerland May 6, 1935

6 Claims. (Cl. 290—7)

This invention relates to supercharged combustion engines in connection with direct power transmission. In accordance with the invention the fuel supply, besides being regulated by the usual speed governor, is regulated not only in dependence on the characteristic value of the supercharging, but also on the characteristic value of the power transmission in such a way that on breakdown of the supercharger the quantity of fuel and the characteristic value of the power transmission are automatically adjusted for the purpose of preventing excessively long running in the critical speed range.

It is known to protect supercharged combustion engines from overload by regulating the amount of fuel injected according to the state of the charging air. To regulate the fuel supply in dependence on exhaust pressure and the pressure of the charging air is also known. With such regulation the fuel supply is diminished with falling charging-pressure or exhaust pressure and thereby the combustion engine is protected from overload. Such regulation however has several disadvantages, and in certain circumstances constitutes a danger for the combustion engine, since on a lessening of the fuel supply under a given operating condition fixed by the governor and by the external load the influence of the governor is eliminated, and owing to the smaller fuel supply the speed of the combustion engine falls or the machine is even brought to a stop.

Such a drop of speed or stopping of the engine is not dangerous in and by itself, but in most cases is undesired. However, it becomes dangerous if the amount of fuel determined by the governor holds the power output of the combustion engine in equilibrium with the external load within the critical speed range of the combustion engine, so that the engine runs for a rather long time at a speed harmful under the conditions.

By the present invention this disadvantage is avoided. The device regulating the fuel supply in dependence on the supercharging pressure and the device adjusting the characteristic value of the power transmission in dependence on the position of the centrifugal governor can be connected together in such a way that on disablement of the supercharger and as long as the engine runs at a permissible full load under this operating condition, the governor acts only on the regulating device which controls the characteristic value of the power transmission, while the control of the fuel injection is effected by a control device responsive to the supercharging pressure.

If the control of a characteristic value of the power transmission is effected by the centrifugal governor of a Diesel engine for example, to provide constant output of the Diesel engine, then the means interconnecting the Diesel engine governor and the device regulating the power transmission in dependence on the pressure of the charging air can be adjusted in such a way that the reduced output is kept constant so that the governor sets the correspondingly reduced quantity of fuel.

Further in accordance with the invention, upon disablement of the supercharger the adjustment of the quantity of fuel and the regulation of the characteristic value of the power transmission can be effected by the same means, independently of the governor. In the case of electrical transmission of power this additional regulation can be effected by a device which controls the excitation of the generator coupled to the engine, and can take place, for example, by cutting in and cutting out resistance in the excitation circuit of the generator. If the power transmission be hydraulic, then the additional regulation can be effected by controlling the primary or the secondary side, or both the primary and the secondary side, of the hydraulic gear.

A few examples of practical embodiments of the present invention are shown diagrammatically in the accompanying drawings, wherein:

Fig. 1 is a view of a combustion engine installation, the regulating devices being shown partially in cross-section;

Figs. 2, 3, 4, 5, and 6 show additional embodiments of the invention in connection with electric power transmission; and Fig. 7 shows an embodiment as applied to hydraulic power transmission.

The installation shown in Fig. 1 consists of a Diesel combustion engine A, which is coupled to an electric generator B and mounted on a frame C. The charging of the combustion engine A takes place through a supercharger D, which consists of a compressor 1 driven by an exhaust-gas turbine 2. The compressor 1 draws the air through a filter 3 and forces it into the intake manifold 4 and from there into the individual working cylinders 5. The regulating device E is responsive to the pressure of the charging air in the manifold 4, and includes a diaphragm 6, which is connected to the charging manifold 4 by the pipe 7, a control valve 8 and a servomotor piston 9. F is the fuel pump and G is the governor. The device H regulates a characteristic value of the power transmission such as the voltage or the excitation of the generator, and is hereinafter sometimes called the field regulator of the generator. Between the fuel pump regulator 10 and the governor G there is arranged a resilient intermediate member 11. The field regulator H is connected to the governor G by means of a rod 12 and has a control valve 13 and a servomotor piston 14.

*Operation of the control devices*

The regulating device E is acted upon by the pressure of the charging air which reaches the diaphragm 6 via the pipe 7. The movement of the diaphragm 6, which is kept in equilibrium by a spring 15, is transmitted by a rod 17 to the valve 8, which connects the oil space 18 over the piston 9 with the pressure-oil pipe 19 or with the discharge 19a. The movement of the piston 9 is transmitted by the piston rod 20 and the angle lever 21 to the regulating rod 10 of the fuel pump F. The resilient connection 11 permits a displacement of the regulating rod 10 regardless of the position of the governor G.

Fig. 1 shows the position of the regulating device E at full load. If now for any reason the charging pressure falls, then the spring 15 presses the diaphragm 6 back correspondingly. Thereby the rod 17 with the valve 8 is displaced and the space 18 over the piston 9 is connected to the discharge 19a. The spring 22 presses the piston 9 upwards and shifts the angle lever 21 in such a way that the regulating rod 10 is moved towards the right so that the fuel pump F delivers a smaller charge. The movement of the piston 9 continues until the valve 8 has again arrived in the closing position shown in the drawings. At this moment the speed of the engine also falls and the governer G will move the rod 23 to the left as if to increase the capacity of the fuel pump. However, the resilient member 11 takes up the movement of the regulator rod 23 and the speed of the engine would continue to fall until the external load, that is, the output to be delivered by the generator, would be in equilibrium with the decreased fuel pump capacity. By the field regulator H such a permanent drop of the speed is now prevented. Because the governor rod 23 moves to the left, the rod 12 moves likewise, and the angle lever 25 brings the control valve 13 out of its central position, illustrated. The pressure oil supplied to space 26 can then get under the piston 14 which is thereby raised. This moves the lever 29 in such a way that suitable resistance 30 is cut into the exciter circuit of the generator and thereby the external load is decreased until the speed of the engine again increases and has once more reached the value had before the starting of the regulating process above described. The device H is provided with a movable valve bushing 31 which is actuated from the control board by the lever 32 via the shaft 33. This makes it possible to adjust from the control board different loads on the generator.

The device H therefore makes use of the temporary slight drop in the speed of the combustion engine to start the regulating process for the purpose of preventing a permanent drop of speed. Care should be taken that the regulating resistances are as large as the regulating range requires.

The most important function of the device H, however, is in providing overload protection, and, in fact, it protects the combustion engine from any overload which comes from the output, i. e., on the power delivery side, in contrast to the overload protection device E, which protects the combustion engine from overload due to lack of air. The method of operation for that purpose is the same as for the prevention of the fall in speed. The governor G transmits its movement via the rod 12 to the angle lever 25 and from there to the control valve 13. Now as long as the combustion engine runs at reduced output the control valve 13 remains above the illustrated central position; and the oil pressure from the space 26 will be transmitted to the upper side of the piston 14 to hold the piston firmly in its lower position. If now the external load of the combustion engine increases, then the valve 13 moves downward past the central position. Thereby the lower side of the piston 14 receives pressure oil, while the upper side is connected to the discharge. The piston 14 now moves upward under the influence of this pressure oil and by means of the lever 29 cuts in resistance into the exciter circuit of the generator. Thereby the input of the generator falls and the combustion engine is relieved. The consequence is that its speed rises and the regulator leads the valve 13 back into its central position. This position corresponds to the permissible load of the combustion engine.

By shifting the control bushing 31 and therewith also the control limits, the load of the combustion engine can be changed over a wide range. This can take place, during the operation, by hand via the shaft 33 and the lever 32, or by a suitable automatic device not shown in the drawings.

In traction operation it very often occurs that the motor cars have to overcome considerable differences in altitude. When the altitude increases, however, the air pressure falls and therewith the weight of air drawn in by the supercharger D. In this case it is possible to overload a supercharged combustion engine without it being necessary that the supercharger operate abnormally.

Figure 5:
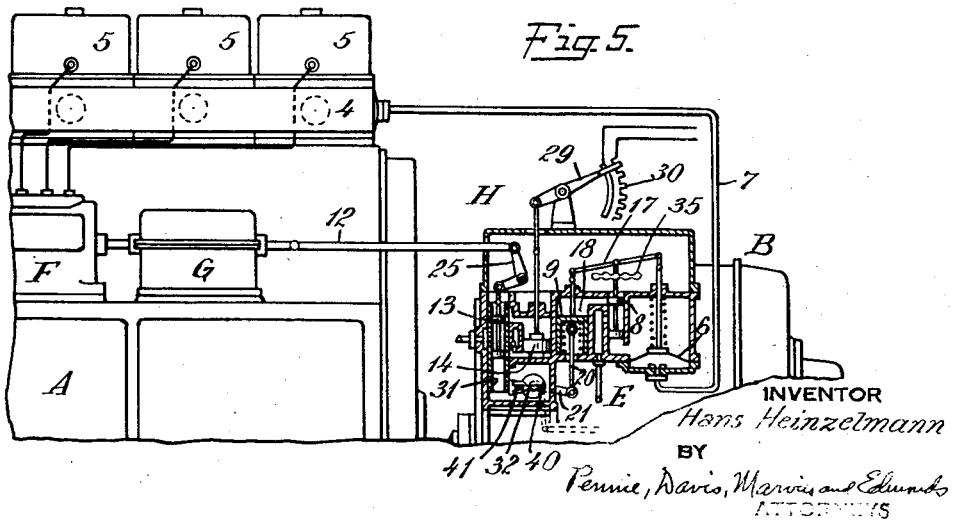

In combustion engines which work under such conditions there is further provided an apparatus which takes into consideration the barometric height or atmospheric pressure. Such an additional modification is shown in Figs. 2, 3 and 5.

Figure 2:
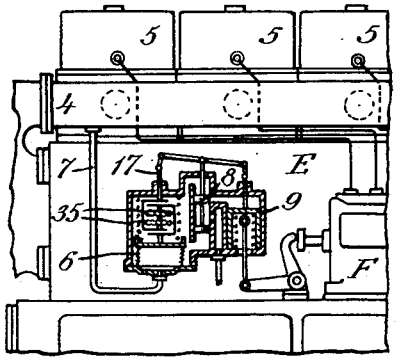

Fig. 2 shows a construction in which two diaphragms 35 are inserted in the rod 17. The diaphragms are filled with air at normal atmospheric pressure and tightly sealed. With falling external pressure and therefore falling barometric height the internal pressure of the diaphragms causes an expansion. This shortens the rod 17 and acts on the position of the valve 8 so that the piston 9 reduces the capacity of the fuel pump F in proportion to the decrease of the atmospheric pressure.

Figure 3:
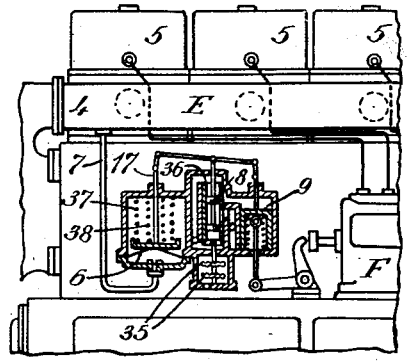

In accordance with Fig. 3, instead of a shortening of the rod 17 there takes place a shifting of the valve bushing 36 and therewith of the control limits for the valve 8. This shifting is caused by the diaphragms 35 which respond to the changing barometric height. Since in this case the direct transmission of the movemnet of the diaphragms will not be readily possible because of excessive resistance to movement of the valve bushing, it is advantageous to control first of all by the diaphragms a control valve which then indirectly actuates the valve bushing by means of a pressure-oil servomotor. A servomotor valve controlled by such a diaphragm is shown in Fig. 5.

In Fig. 3 the diaphragm 6 is shown to be loaded with two springs 37, 38. According to the adapting of the regulating characteristic to the load limit of the combustion engine, several springs can be brought into engagement successively.

Figure 4:
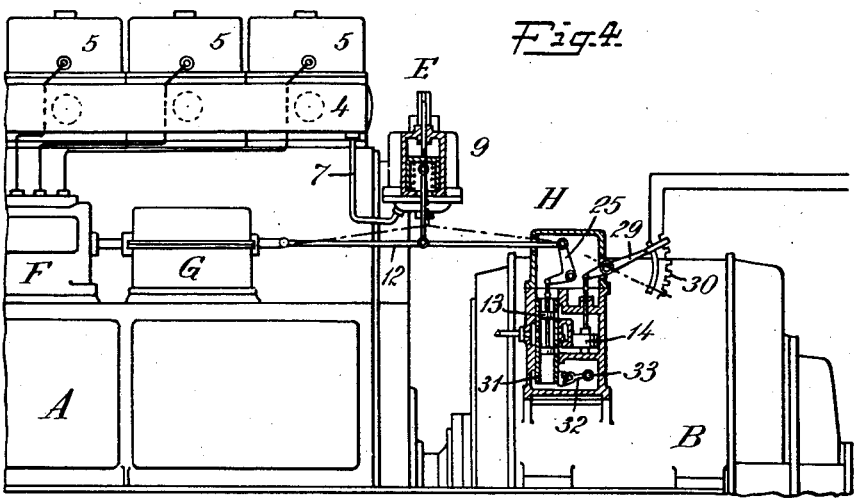

In Fig. 4 the overload protection device E is inserted between the governor G and the field regulator H. The construction and principle of operation of the device E has been described in connection with Fig. 1. The control action here is as follows: When the piston 9 moves upward and effectively shortens the rod 12 according to the operating condition of the impeller and also according to the barometric height previously referred to, the capacity of the fuel pump is decreased, the valve 13 is moved downward and thereby the piston 14 is moved upward, so that in the manner described in connection with Fig. 1, suitable resistance 30 is connected into the exciter circuit of the generator and the combustion engine is relieved of the excess load.

Fig. 5 shows a modification in which the field regulator H and the overload protection device E are built integral. The two devices operate in the manner already described. There is, in this modification, a difference only in the adjusting of the load limit. For this purpose the piston 9 transmits its movement via the rod 20 to the lever 21. On this lever axis there is mounted eccentrically a second lever 32. The position of this lever is determined by the piston 9, and besides by a device, not shown in the drawings, which makes it possible to effect additional load limit changes as desired. Fig. 5 shows the apparatus in full load position. If now for any reason the pressure of the charging air falls, whether through failure of the air impeller or because of drop in barometric height, then the valve 8 connects to the discharge the space 18 over the piston 9. Thereby, via the lever 21, the point of attack of the lever 32 in the eccentric 40 is moved upwards. As the lever 32 is connected via a fork-shaped connection 41 to the valve bushing 31, then this also moves upward. Thus, the control limits are displaced and the valve 13 liberates the pressure-oil supply under the piston 14. Since the upper side of the piston is also connected to the discharge, the piston 14 moves upward. By movement of lever 29, suitable resistance 30 is now inserted in the exciter circuit of the generator until the load has fallen to such an extent that the governor G has brought the valve 13 into the closing position via the rod 12 and the angle lever 25. In this position a state of equilibrium is again attained and the combustion engine continues to run with this new load. In spite of the change of load the speed of the combustion engine has remained approximately constant.

The embodiment according to Fig. 6 differs, as do those of Figs. 4 and 5, in the method of the transmission of the movements of the piston 9 of the device E to the control valve 13 of the field regulator H. If the pressure of the charging air in the manifold 4 falls, then the piston 9 moves upward. Via the rod 20 and the lever 43 pivoted at 42 this movement is transferred to the angle lever 25, suspended at the end of the right arm of this lever 43, and from there to the control valve 13. This movement takes place independently of the position of the control rod 12, just as the governor G can also displace the angle lever 25 and the control valve 13 independently of the position of the piston 9. If the valve is moved below its central position, pressure oil is led under the piston 14 from the space 26. In the manner heretofore described the resulting movement of lever 29 cuts in more resistance 30 into the exciter circuit of the generator B. Hence, the absorbed generator power falls and therewith also the load on the combustion engine. The engine speed therefore increases, and the regulator, via the rod 12 and the angle lever 25, shifts the control valve 13 upwards. In the central position a state of equilibrium between the new permissible output of the combustion engine and the external load is attained. With this arrangement the same speed of the combustion engine is not maintained exactly, but rather a speed which corresponds to the natural drop of speed of the governor.

In internal combustion engines of large output and with many working cylinders several charging air impellers are frequently used. Such a multiple arrangement offers advantages in the construction of the intake and exhaust-gas pipes. In connection with the overload protection device E and the field regulator H there results, moreover, a further important advantage. On the breakdown of a charging-air impeller it is not necessary to adapt the whole output of the combustion engine to the condition of the defective unit, but it is possible nevertheless to fully load the working cylinders fed by the normally operating air impellers. This gives, for example, in engines with two charging-air impellers, in case of complete breakdown of a unit, a load capacity of the combustion engine of 75%, instead of only 50% if the whole combustion engine had to be adapted to the state of the non-operating air impeller.

The method of operation of the device E of Fig. 6 acting as an overload protection is the same as previously explained. It must be mentioned that the combustion engine of course has only one governor, and that for each charging-air impeller there must be present a device E to provide over-load protection, and a fuel pump F belonging to this group. Should an air impeller cease to operate, then the device E adjusts the corresponding fuel pump F to proportionately decreased capacity. As the fuel pumps F are connected flexibly with the governor G through the resilient member 11 (Fig. 1), the governor position is not influenced for the time being. With reduced capacity, however, when the external load remains constant, the speed of the combustion engine falls, and the governor G will adjust the fuel pumps F for greater capacity. This however is only possible temporarily in fuel pumps whose respective air impellers still work normally. At the same time, however, the governor moves the control valve 13 via the rod 12 and the angle lever 25. If the valve moves above the central position, the lower side of the piston 14 receives pressure oil. This then moves upwards and by means of the lever 29 inserts more resistance 30 into the exciter circuit of the generator B. Thereby the output of the generator is lessened, the combustion engine is relieved and its speed again increases. The governor G again moves the valve 13 upward, and in the central position the external load comes into equilibrium with the new load capacity of the combustion engine. The engine continues to run at the same speed as before the start of the regulating process. Those working cylinders having the normally operative charging-air impellers receive as before the same quantity of fuel, while the others receive a lessened quantity of fuel proportionate to the charging pressure.

In the embodiment shown in Fig. 7, the power transmission takes place hydraulically, and it is understood that the left half of the installation is constructed in accordance with Fig. 1. Hence, there occurs, instead of the field regulation of the generator, a regulation of the amount of transmitted power by displacing the blades or by changing the cross-sectional area of the conduit. In well-known hydraulic gears, such as the Föttinger type, this control can take place either on the primary side or on the secondary side, or on both the primary side and the secondary side. The regulating means 45 of the hydraulic gear K is shifted in the manner pointed out in connection with the lever 29 of the field regulation of the previously described constructions.

I claim:

1. The combination with a supercharged internal combustion engine and a power transmission system which comprises means for supplying fuel to the engine, a governor driven by the engine which is operatively connected to the means for supplying fuel, means for charging air to the engine, a regulator actuated by the pressure of the charging air, means operatively connecting the regulator and the fuel supply means, whereby the supply of fuel may be varied in accordance with the pressure of the charging air, means operatively connected with the regulator for influencing the action of the governor, a generator driven by the engine, a device for varying the load on the generator, and means operatively connecting the device and the governor, whereby the fuel supply means may be responsive to the action of the device.

2. An internal combustion engine combination according to claim 1 in which the means for supplying the fuel is not only responsive to the pressure of the charging air, but also to the atmospheric pressure.

3. An internal combustion engine combination according to claim 1 in which the device is provided with means which decreases the load on the generator when the speed of the engine is relatively low.

4. The combination with a supercharged internal combustion engine and an indirect power transmission apparatus which comprises means for supplying fuel to the engine, a governor driven by the engine which is operatively connected to the means for supplying fuel, means for charging air to the engine, a regulator actuated by the pressure of the charging air, means operatively connecting the regulator and the fuel supply means, whereby the supply of fuel may be varied in accordance with the pressure of the charging air, means operatively connected with the regulator for influencing the action of the governor, an indirect power transmission driven by the engine, a device for regulating the power transmitted by the indirect power transmission, and means operatively connecting the device and the governor, whereby the fuel supply means may be responsive to the action of the device.

5. An internal combustion engine combination according to claim 4 in which the means for supplying the fuel is not only responsive to the pressure of the charging air, but also to the atmospheric pressure.

6. The combination with an internal combustion engine which comprises a power transmission apparatus driven by the engine, a fuel pump, a governor driven by the engine operatively connected to the pump, a supercharger for supplying the engine with air, a device for regulating the power transmission, said device being connected to the supercharger and actuated by the pressure of the charging air, and means connecting the device to the governor which cause the governor to decrease the fuel supply in accordance with decreased power output of the power transmission.

HANS HEINZELMANN.